Jan. 21, 1969  R. AYRANTO  3,423,030
MATERIAL UNLOADER
Filed Oct. 7, 1966
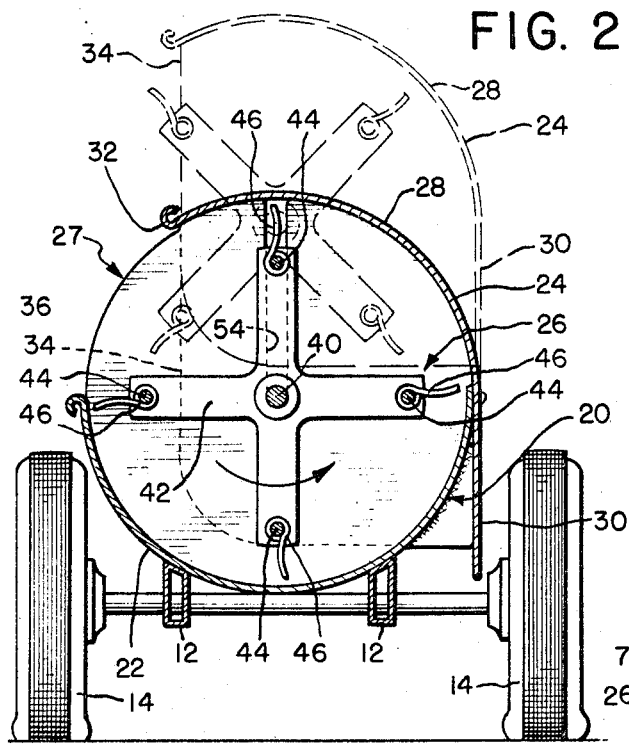
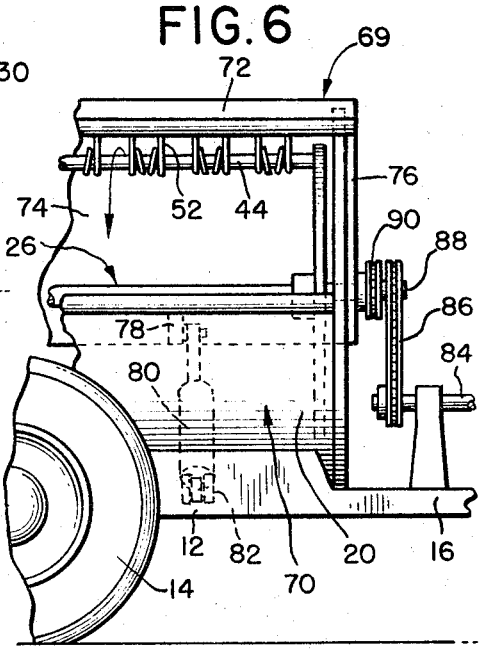
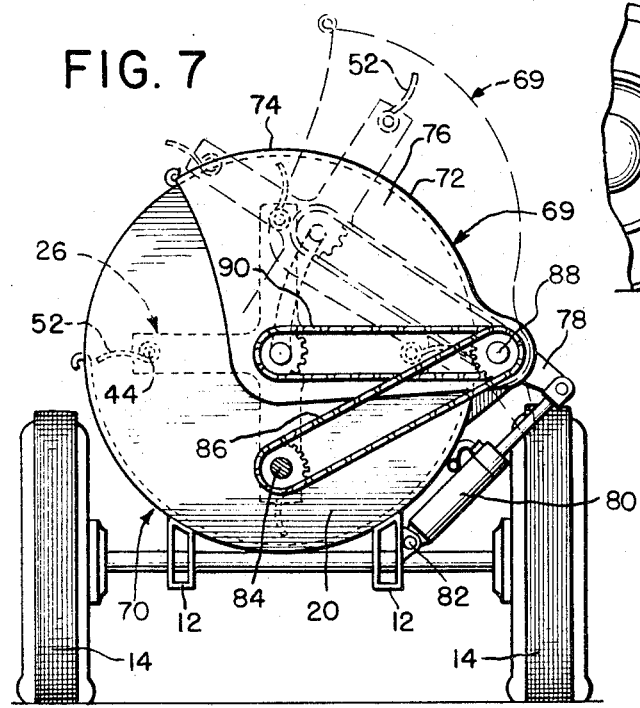
Inventor
Roy Ayranto
Attorney United States Patent Office 3,423,030
Patented Jan. 21, 1969

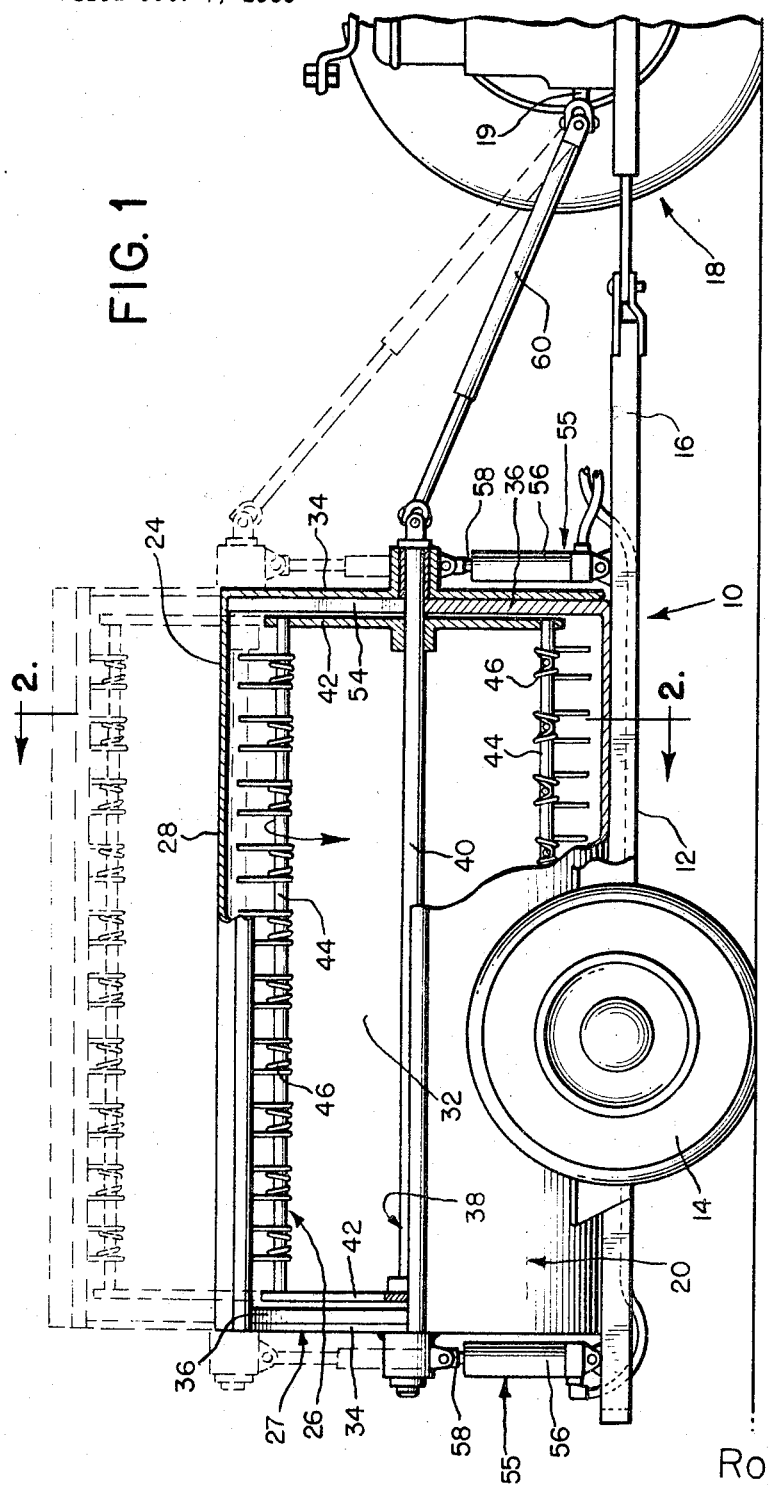

3,423,030
MATERIAL UNLOADER
Roy Ayranto, Grimsby, Ontario, Canada, assignor to International Harvester Company, Chicago, Ill., a corporation of Delaware
Filed Oct. 7, 1966, Ser. No. 585,030
U.S. Cl. 239—681   2 Claims
Int. Cl. A01c 17/00

ABSTRACT OF THE DISCLOSURE

A mobile tank type manure spreader including a rotatable beater for throwing material from the tank. The beater is mounted on a cover for the tank which is spaced from the tank to define a laterally directed opening for the discharge of material. Power means are mounted on the spreader for moving the cover and beater in unison toward and away from the tank.

---

The present invention relates to a material unloader.

The material unloader or implement of the present invention is also known as a manure spreader and is utilized for unloading and spreading various materials, including commercial fertilizers in both solid and liquid form.

The material unloader is of the type having a container and a beater therein extending substantially throughout the area of the container, and upon rotation of the beater, the material is thrown from the container and spread on the ground, the implement eliminating such relatively complicated and expensive items as a conveyor for carrying the material in the container to the beater.

A broad object of the invention is to provide in a material unloader of the foregoing general character, a novel construction wherein the beater becomes effective on the surface of the material in the container, progressively as the load of that material becomes depleted.

A more specific object is to provide a material unloader of the foregoing general character in which the beater is movably mounted and raised to an upper position to provide initial clear space for loading the container and then in the unloading operation is progressively lowered against the material as the material is progressively unloaded.

Another and detail object is to provide a special construction of cover for the container which maintains the same relation to the beater in all positions of the beater.

In one form of the invention the beater is raised and lowered in straight vertical movements and in another form in swinging arcuate movements.

Other objects and advantages of the invention will appear from the following detail description taken in conjunction with the accompanying drawings wherein:

FIGURE 1 is a side view partially in section of a material unloader made according to the present invention;

FIGURE 2 is a view taken at line 2—2 of FIGURE 1;

FIGURE 3 is a detail view of one form of finger used in the beater;

FIGURE 4 is a detail view of another form of finger;

FIGURE 5 is a detail view of still another form of finger;

FIGURE 6 is a side view of a portion of a modified form of material unloader; and FIGURE 7 is an end view taken from the right of FIGURE 6.

Referring now in detail to the accompanying drawings, the material unloader or implement made according to the present invention is indicated in its entirety at 10, having a chassis 12 mounted on wheels 14, and including a tongue 16 by which it is connected to a tractor 18 having a power take-off shaft 19.

Mounted on the chassis is a container 20 for containing the material to be unloaded and which may also be referred to as a box, and since the container may be utilized for liquids, it may also be referred to as a tank. The container includes a lower portion 22 of generally semi-cylindrical shape and an upper portion 24 forming a cover movable relative to the lower portion in a manner described hereinbelow.

The implement includes a beater 26 for engaging the material in the container and throwing it therefrom and spreading it on the ground. The cover 24 and beater together form an assembly 27 which is movable in the manner mentioned.

The cover 24 of the container includes a top cylindrical element 28 and a rear vertical plate 30 extending downwardly beyond the upper edge of the bottom portion. The cover element 28 extends less than a semi-cylinder leaving a space 32 which forms an opening from the container directed laterally from the axis of rotation of the beater 26. The cover may be provided with end plates 34 and the lower portion 20 may also be provided with end plates having vertical extensions 36 extending thereabove. The opening 32 is maintained in all positions of the cover.

The beater 26 is mounted for rotation, as stated, and includes a body 38 made up of a central shaft 40 and end plates 42. At the periphery of the end plates are axial rods or bars 44 serving as carriers for fingers 46 which may be of any of various kinds. FIGURE 3 shows one form of such finger which is made up of a wire having a central coiled portion 46 encircling the rod 44 with a looped portion 48 secured against rotation by a rivet or pin 50 mounted in the rod. The finger is of generally U-shape having end portions 52 which form finger elements or prongs of limited flexibility extending generally radially away from the body of the beater and serving as the elements directly engaging the material in the container to be unloaded. The finger elements 52 may be curved as shown in FIGURES 3 and 5, or of other shape as desired. FIGURE 4 shows a modified form of finger which is similar to that of FIGURE 3 but includes a drag 54 or scoop which may be utilized for use with liquids.

The beater is mounted in the container for vertical movement and in the present instance for straight vertical movement, the shaft 40 extending through slots 54 in the end plates 36. The beater is raised and lowered by suitable means such as hydraulic power devices 55 including cylinders 56 mounted on the chassis and rams 58 engaging the shaft 40 or the bearing blocks in which the shaft is mounted. Connected to the shaft 40 is a connecting shaft 60 connectable with the power take-off shaft 19 of the tractor.

In operation of the implement, the container is loaded with the material to be unloaded and drawn by the tractor along the area in which the material is to be unloaded and spread. In the loading operation the assembly 24 including the beater and the cover is first raised by the power devices 55 to the upper position represented in FIGURE 2, and in this position the cylindrical surface containing the outer ends of the fingers 52 is adjacent the intended upper surface of the material to be placed in the container. The exact amount of material put in the container may vary, and actually extend above the top of the lower portion 22, but at this stage the fingers, upon rotation of the beater, engage only the upper portion of the material and throw or fling it out through the opening 32 onto the ground. As the load of material gradually lessens and the upper surface thereof lowers, the beater is let down progressively under the control of the power devices 55 so that the fingers continue to bite or dig into the material at about the same depth, continuously throwing or flinging it from the container and onto the ground. This action is continued until the load is substantially depleted and the beater is at its lowermost position as represented in solid lines in FIGURE 2 wherein the ends of the fingers sweep over the bottom surface of the lower member 22, engaging that surface, or nearly so, sweeping the last remnants of the material therefrom and out through the opening 32.

The complete assembly 27 is moved vertically under the action of the power devices 55, and since the cover 24 moves with the beater, the top curved or cylindrical surface 28 remains in constant relation thereto, i.e., in which the ends of the fingers nearly engage that cylindrical surface. This cylindrical surface reacts against and holds the material carried by the fingers, preventing it from being flung outwardly before reaching the opening 32, when it is thrown or flung out onto the area in which it is intended that the material be spread.

The cylindrical element 22 of the lower container is preferably only semi-cylindrical in extent so that when the beater is in its lowermost position the axis thereof is substantially at the upper edge of that portion, and when the cover is in its lower position, it and the lower portion form a cylinder, except for the opening 32.

The shaft 40 of the beater is preferably disposed at the axis of the cylindrical surface 28 so that when the cover is moved down into its lowermost position the beater is concentric with both cylindrical surfaces. It will be understood that the rear plate 30 is a part of and moves with the assembly 27.

Referring now to FIGURES 6 and 7 the construction shown in these figures is essentially the same as that shown in FIGURES 1 and 2 in that an upper assembly 69 which includes the beater and cover is moved upwardly and downwardly, but in this case it is swung in an arcuate path out of its lowermost position as distinguished from a straight vertical path as in FIGURES 1 and 2. In the present instance the container 70 includes a bottom portion 20 which may be identical to that described above. The cover 72 corresponding with the cover 24 includes a cylindrical element 74 and end plates 76. The beater 26 is mounted in and carried by the cover 72 in the movements of the latter, the latter including a lug 78 to which is connected a power device 80 which is also connected with a fixed element 82. Upon contraction of the power device 80 the upper assembly 69, with the beater therein, is swung to an upper position represented in dot-dash lines and upon release of the raising power that assembly lowers to the solid line position. In the upper position of the assembly, the fingers 52 at the lower portion of the beater are in position to engage or dig into only the uppermost portions of material in the container and as the material is thrown out, and the load thereof depleted, the assembly is progressively lowered until it reaches its lowermost position in which the beater nearly engages the cylindrical surface of the lower portion of the container. In the present instance the cover is cut away to provide a side opening from the container, as described in connection with the first form, in all positions of the upper portion, and in the present instance also the outer cylindrical element of the cover is disposed closely adjacent the surface of the revolution of the beater.

In this instance also a shaft 84 is connected with the beater shaft and connectable with the power take-off shaft of the tractor, for driving the beater. In the present instance the drive to the beater includes a chain or belt 86 driven from the shaft 84 and driving an idler pulley or sprocket 88, on which is trained another belt or chain 90 directly driving the shaft of the beater. Upon swinging movements of the upper assembly 69, the belt or chain 90 follows the movements of the beater in an arcuate path concentric with the axis of the idler 88.

The preferred form of the construction is that the beater be disposed on an axis generally extending longitudinally of the line of travel, but of course it may be disposed in other directions, and even so as to throw the material rearwardly.

While I have disclosed herein certain preferred forms of the invention it will be understood that changes may be made therein within the spirit and scope of the appended claims.

I claim:
1. A material unloader comprising: a wheeled chassis; an open top container on the chassis for receiving a load of material to be unloaded; an upper assembly including a cover and a beater rotatably mounted thereon, said cover including a top semi-cylindrical portion overlying said beater and having an edge spaced above said container to define an opening therebetween directed laterally from the axis of rotation of said beater; and means for moving said upper assembly in straight vertical directions into and out of a lowermost position in which said beater extends into said container to sweep material from the surface thereof.

2. The subject matter of claim 1, wherein said cover includes a vertical plate portion disposed along a side of said container opposite said opening and extending below the top of said container in all positions of vertical movement of said upper assembly.

References Cited
UNITED STATES PATENTS

| | | | |
|---|---|---|---|
| 1,037,038 | 8/1912 | Mott | 239—682 |
| 1,282,946 | 10/1918 | Rapp | 239—681 |
| 1,591,506 | 7/1926 | Blakeslee | 239—220 |
| 1,646,878 | 10/1927 | Schaefer | 239—684 |
| 2,699,948 | 1/1955 | Neighbour | 239—662 X |
| 3,121,568 | 2/1964 | Wilkes et al. | 239—658 |
| 3,167,318 | 1/1965 | Ferris | 239—658 |

EVERETT W. KIRBY, *Primary Examiner.*

U.S. Cl. X.R.
239—658, 686